United States Patent Office 2,830,994
Patented Apr. 15, 1958

2,830,994

PROCESS FOR MANUFACTURE OF ISONICOTINIC ACID HYDRAZIDE FROM PYRIDINE NITRILE

Edward James Gasson, Epsom Downs, England, assignor to The Distillers Company Limited, Edinburgh, Scotland, a British company No Drawing. Application June 11, 1956
Serial No. 590,349

Claims priority, application Great Britain June 29, 1955

8 Claims. (Cl. 260—295)

The present invention relates to a process for the manufacture of isonicotinyl hydrazide.

Isonicotinyl hydrazide is a valuable compound used as a pharmaceutical product. Its preparation in a simple manner resulting in as pure a product as possible and from starting materials which are readily accessible is therefore of importance.

Isonicotinyl hydrazide can be produced by reacting hydrazine with isonicotinamide, which, in turn may be prepared according to our co-pending U. S. appln. No. 569,231, filed March 5, 1956, by partly hydrolysing 4-cyanopyridine in an aqueous medium in the presence of the oxide, hydroxide or carbonate of magnesium or an alkaline earth carbonate as a weakly basic catalyst.

It is an object of the present invention to dispense with the separate production of isonicotinamide and to prepare the isonicotinyl hydrazide directly from 4-cyanopyridine in a single stage operation.

According to the present invention, the process for the manufacture of isonicotinyl hydrazide comprises reacting at elevated temperatures hydrazine with 4-cyanopyridine in the presence of water with or without a water-miscible organic solvent.

Suitable water-miscible organic solvents are those which dissolve both reaction components and water, for instance, methyl and ethyl alcohol. The temperatures at which the reaction may be effected may vary within very wide limits. It is preferred, however, to carry out the reaction at a temperature between about 80° C. and the boiling point of the reaction mixture.

Instead of hydrazine itself, hydrazine hydrate may be used.

It is advantageous to employ the hydrazine or the hydrazine hydrate in molecular excess based on the cyanopyridine used.

It has been found that when 4-cyanopyridine is reacted with hydrazine by the process of this invention, in addition to isonicotinyl hydrazide, solids of high melting point are formed especially when the initial concentration of the cyanopyridine in said reaction mixture exceeds 10%. These high melting basic substances are insoluble in water, alcohol, chloroform and other organic solvents. The formation of these substances may, to a certain extent, be suppressed by operating with the 4-cyanopyridine at a concentration of less than 10% and preferably at a concentration of about 5%.

It has further been found that improved results regarding the production of isonicotinyl hydrazide are obtained when the reaction is carried out in the presence of an alkaline catalyst. Such alkaline catalysts are, for instance, the hydroxides, oxides or carbonates of alkali metals, alkaline earths or magnesium, further ammonia or organic amines. The amount of the alkaline catalysts to be added to the solvent may vary within wide limits depending partly also on the alkalinity of the compounds. The amount giving the best results can be ascertained readily by experiment.

By working with an aqueous solution of cyanopyridine, the formation of the high melting products is largely avoided and by adding a suitable quantity of alkaline catalyst to the aqueous medium, the concentration of the 4-cyanopyridine may be increased without leading to undue formation of the high melting by-product. For economic reasons, it is advantageous to employ the hydrazine in a slight molecular excess based on the cyanopyridine used.

That the reaction proceeds readily and with improved yields in alkaline solution is surprising as it was known that 4-cyanopyridine easily undergoes hydrolysis in the presence of alkaline substances with the formation of isonicotinic acid or its salt. This, in conjunction with the hydrazine, would be expected to lead to the production of hydrazine isonicotinate.

The following examples illustrate the manner in which the process of the invention may be carried out in practice. The parts given are parts by weight and the yields are based on the cyanopyridine.

*Example 1*

4 parts of 4-cyanopyridine, 80 parts of water and 4.5 parts of hydrazine hydrate were heated together in a steam bath for 6 hours, cooled, and filtered to remove insoluble by-products. The aqueous filtrate was extracted with ether to remove colouring matter and unreacted cyanopyridine, and evaporated to dryness on a steam bath. The residue of crude isonicotinyl hydrazide amounted to 3.8 parts and was twice crystallised from aqueous methanol, and yielded 2.1 parts of almost pure hydrazide melting at 168–170° C. The yield of purified product was 40% calculated on the 4-cyanopyridine.

*Example 2*

4 parts of 4-cyanopyridine, 80 parts of water and 4 parts of hydrazine hydrate were heated with the addition of 0.04 part of magnesium oxide on a steam bath for fifteen hours. The solution was filtered while hot to remove magnesia and any insoluble compound formed by the reaction and then evaporated to dryness. The solid residue was crystallised from methanol. Almost pure isonicotinyl hydrazide, melting point 165° C., was obtained in a yield of 61%. After recrystallisation from methanol, the melting point was 171–173° C.

*Example 3*

4 parts of 4-cyanopyridine, 4 parts of hydrazine hydrate, 30 parts of water and 2 parts of normal sodium hydroxide solution were heated under reflux for six hours. The solution was filtered while hot to remove a small quantity (0.2 part) of an insoluble by-product and the solution concentrated until the crystals separated. The product in an amount of 3.5 parts was isonicotinyl hydrazide of 90% purity, which gave pure hydrazide after one recrystallisation from methanol. The yield of hydrazide was thus 50%.

*Example 4*

4 parts of 4-cyanopyridine in 12 parts of water were reacted with 4 parts of hydrazine hydrate in the presence of 0.08 part of sodium hydroxide at 100° C. under reflux for seven hours. The product, after filtration and evaporation to dryness, was crystallised from ethanol. The yield of isonicotinyl hydrazide amounted to 3.27 parts which is 62% of the theoretical.

I claim:

1. A process for the manufacture of isonicotinyl hydrazide, which comprises heating 4-cyanopyridine with at least an equimolecular porportion of hydrazine in the presence of water and at a temperature in the range from 80° C. to the boiling point of the reaction mixture, 2. The process claimed in claim 1, wherein a water-miscible organic solvent is present.

3. The process claimed in claim 2, wherein the water-miscible organic solvent is methanol.

4. The process claimed in claim 2, wherein the water-miscible organic solvent is ethanol.

5. The process claimed in claim 1, wherein the concentration of 4-cyanopyridine in the reaction mixture is less than 10% by weight.

6. The process claimed in claim 1, wherein the reaction is effected in the presence of an alkaline catalyst.

7. The process claimed in claim 6, wherein the alkaline catalyst is selected from the group consisting of the oxides, hydroxides and carbonates of the alkali metals, the alkaline earths and magnesium.

8. A process for the manufacture of isonicotinyl hydrazide, which comprises heating hydrazine, in the form of hydrazine hydrate, with 4-cyanopyridine in the presence of water and at a temperature in the range from 80° C. to the boiling point of the reaction mixture, the molar proportion of 4-cyanopyridine to hydrazine hydrate being in the range from 1:2 to 1:2.25.

References Cited in the file of this patent

Meyer et al.: Monatsh, für Chemie, vol. 33, pp. 393–414 (1912).